Patented Oct. 5, 1954

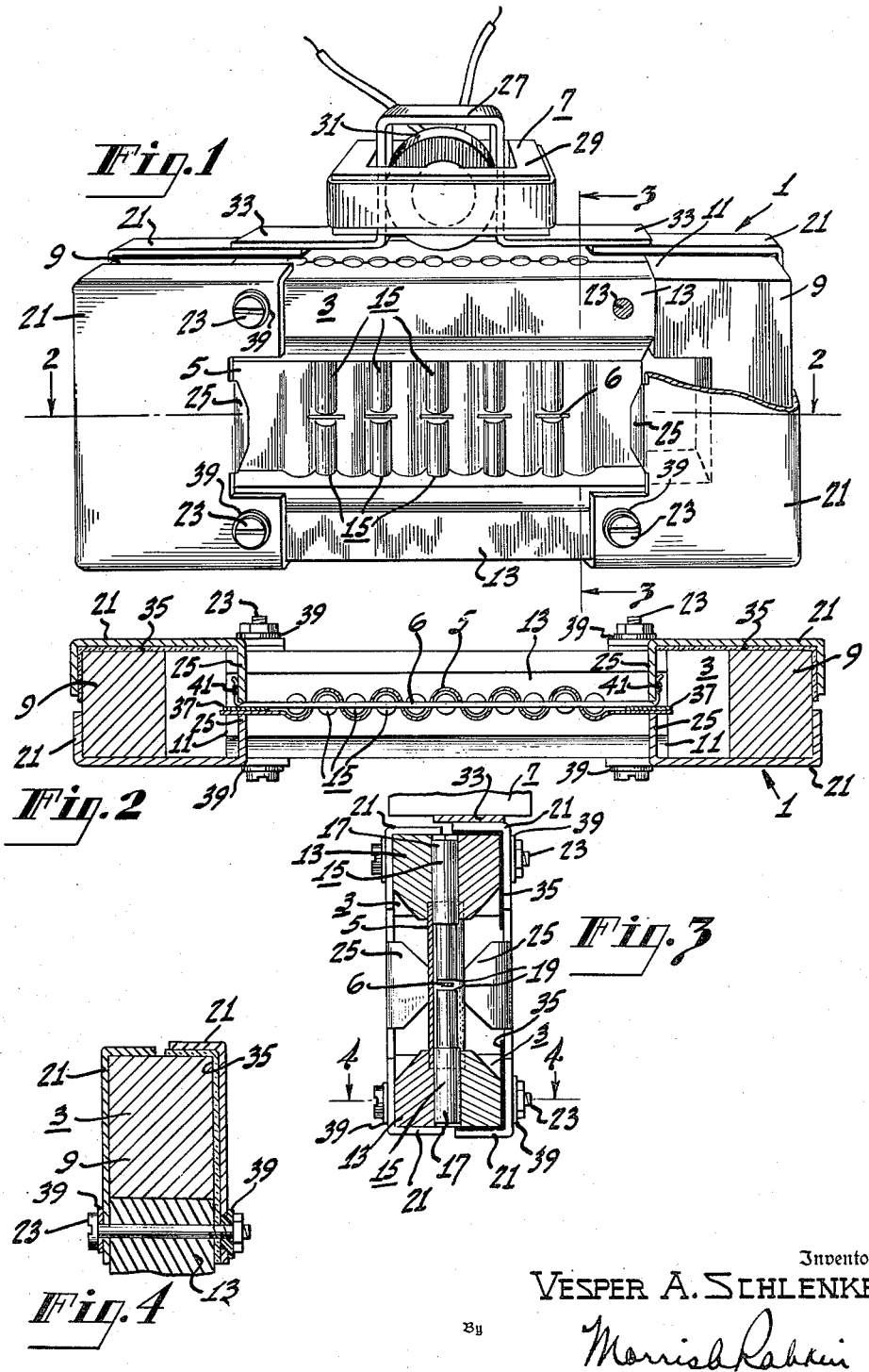

2,691,148

UNITED STATES PATENT OFFICE 2,691,148

ULTRASONIC TRANSDUCER

Vesper A. Schlenker, Camden, N. J., assignor to Radio Corporation of America, a corporation of Delaware Application June 24, 1950, Serial No. 170,113

8 Claims. (Cl. 340—8)

1

This invention relates to sound translating apparatus, and more particularly to a transducer which is useful in transmitting and receiving signals in the ultrasonic range.

It is sometimes desirable to have communication apparatus which will transmit and receive intelligence over distances not greater than 1000 feet. In such apparatus, a transducer which is operative over a relatively narrow or restricted band of wavelengths in the ultrasonic range (for example, between 20 and 30 kilocycles) is particularly desirable. An additional desirable characteristic of such apparatus is that it be capable of withstanding rugged handling conditions. Although prior art devices of this kind have been proposed, they possess many disadvantages. For example, in many cases, the apparatus includes a vibratile element of relatively large mass which limits its frequency response to too narrow a band width. In instruments where a thin ribbon conductor is employed to reduce the mass of the vibratory system, the conductor is usually too delicate to withstand rough handling.

It is an object of the present invention, therefore, to provide a transducer for communication equipment which will overcome the above and other disadvantages of prior art translating devices.

Another object of the present invention is to provide an improved transducer for use in two-way communication where it is desired to limit transmission of signals to short distances.

Still another object of the present invention is to provide an improved transducer as aforesaid which is efficient in operation and which is particularly suitable for use under extremely rugged conditions.

A further object of the present invention is to provide an improved transducer of the type set forth the vibrating system of which has a relatively small mass and relatively great stiffness suitable for resonating at ultrasonic frequencies.

Still further, it is an object of the present invention to provide an improved transducer as above set forth suitable for communication apparatus which is compact in construction, and highly efficient in use.

In accordance with the present invention, an ultrasonic transducer is provided which utilizes a relatively large diaphragm of thin sheet material suitable for resonating within a preselected range of sonic frequencies. The diaphragm is provided with a plurality of corrugations in order to add stiffness to the thin sheet material in directions normal to its vibratory movement. A conductor is attached to the diaphragm and arranged to vibrate within a magnetic field for in-

2 terconverting sound waves and electrical oscillations in a manner well known in the art.

The novel features characteristic of the present invention, as well as additional objects and advantages thereof, will be better understood from the following detailed description when read in connection with the accompanying drawing in which, Figure 1 is a front view, in perspective, of an ultrasonic transducer in accordance with a preferred embodiment of the present invention, Figure 2 is a sectional view of the transducer shown in Figure 1, taken along the line 2—2 of Figure 1, Figure 3 is a sectional view of the transducer taken along the line 3—3 of Figure 1, and Figure 4 is a fragmentary view, in section, taken along the line 4—4 of Figure 3.

Referring more particularly to the drawing, wherein similar reference characters designate corresponding parts throughout, there is shown an ultrasonic transducer 1 which comprises a magnetic field structure 3, a vibratory diaphragm 5, a driving conductor 6 and a coupling transformer 7.

The magnetic field structure 3 comprises a closed frame-like member of rectangular shape including a pair of U-shaped permanent magnets 9. The magnets 9 are disposed in a common plane at opposite ends of the structure with their free ends 11 extending toward each other. The free ends 11 of similar polarity are connected by straight pole piece bars 13 of magnetically permeable material to complete the closed, frame-like structure 3. Each of the pole piece bars 13 is divided longitudinally into two halves. A plurality of cylindrical pole pieces 15 are clamped at one end 17 or otherwise suitably fastened between the halves of the pole piece bars 13. The pole pieces 15 extend inwardly into the opening defined by the inner periphery of the magnetic structure 3 and are arranged in pairs along longitudinally common axes. The respective pole pieces 15 of each pair have their adjacent end portions 19 freely disposed in spaced apart relation to provide an air gap therebetween. The pairs of pole pieces are aligned in spaced apart, tandem fashion longitudinally of the magnetic field structure. The free end portions 19 of the pole pieces are arranged so that the air gaps are aligned.

The vibratory system of the transducer 1 comprises the vibratory diaphragm 5 and the driving conductor 6. The diaphragm 5 is made of very thin sheet material, such as aluminum foil, or the like. The diaphragm 5 is generally rectangular in shape and is provided with a plurality of transverse corrugations which may be considered as alternately reversely directed sections with respect to the vertical plane of the conductor 6, as illustrated. The diaphragm 5 is supported at its periphery with the edges thereof clamped between the fastened portions 17 of the pole pieces 15 and the halves of the pole piece bars 13. The diaphragm 5 is arranged in spaced relation to the pole piece portions 19 which are of reduced diameter and are located within the diaphragm corrugations. In this preferred embodiment, individual pairs of pole pieces are disposed alternately on opposite sides of the diaphragm 5 so that the diaphragm 5 describes a serpentine course about them. However, other arrangements may be found equally suitable, such, for example, as disposing two adjacent pairs of pole pieces alternately on opposite sides of the diaphragm.

A flat, elongated, narrow conductor or armature 6 of copper, aluminum, or other suitable material having an enamel coating for electrical insulating purposes extends through the corrugations of the diaphgram 5. The conductor 6 is disposed centrally within the air gaps in spaced relation to the pole piece portions 19 and with its flat sides facing the free ends thereof. A flat conductor is preferred since it has greater rigidity in the direction of vibratory movement, that is, in directions normal to the plane in which the diaphragm is disposed or normal to the longitudinal axes of the pole pieces. In addition thereto, the flat conductor 6 makes it posible to use a much narrower air gap, thereby increasing the magnetic efficiency of the field structure 3. The conductor 6 is attached to the diaphragm 5 at points where it passes through the diaphragm by cementing or other suitable fastening means.

The parts comprising the magnetic field structure 3 are held in assembled relation by two pairs of terminal plates 21. The terminal plates 21 are arranged to substantially cover the magnets 9 at each end of the field structure 3 and to extend over the ends of the pole piece bars 13. Bolts 23, or other suitable fastening means, are provided to extend through the pole piece bars 13 and hold the parts together. The terminal plates 21 are provided with inwardly extending tabs or extensions 25. The tabs 25 at each end of the field structure 3 extend toward each other to an extent necessary to clamp one end of the diaphragm 5 and an end of the conductor 6 between them.

A coupling transformer 7 having a high turn ratio is provided for connecting the conductor 6 with a suitable external amplifier circuit (not shown). The transformer 7 has a single turn secondary winding 27 which is electrically connected to the conductor 6 through portions of the magnetic field structure 3. As shown particularly in Figure 1, the transformer secondary winding 27 comprises a flat U-shaped strip of metal mounted within a core 29. The transformer primary winding 31 is disposed between the sides of the metal strip 27. The ends 33 of the secondary winding strip 27 extend outwardly an amount sufficient to attach them respectively to separate terminal plates 21 disposed at opposite ends on the same side of the field structure 3.

The terminal plates 21 to which the secondary winding ends 33 are attached are insulated from the magnets 9 and the pole piece bars 13 by suitable insulating material 35. Although the enamel coating on the conductor 6 provides adequate insulation for most purposes, additional insulation 37 is disposed between the diaphragm 5 and the conductor in the region of the terminal tabs 25. The insulation 37 is found desirable to insure against failure of the enamel insulation which may be occasioned by the clamping action of the terminal plates 21. Insulating washers 39 are used to insulate the bolts 23 from the plates 21. In order to insure a good electrical connection, the ends of the conductor 6 are secured to the terminal plates 21 by solder 41 (Figure 2) or by any other suitable means.

From the foregoing description, it will be obvious that an extremely rugged structure is provided. The arrangement of parts makes possible the use of very thin sheet material for the vibratory system. The mass of the diaphragm can be kept to a minimum while at the same time preserving a maximum surface area. By corrugating the diaphragm, stiffness is added in directions transversely thereof without affecting normal vibratory motion. Thus, by suitable choice of diaphragm dimensions and number of corrugations, a diaphragm of relatively small mass having the proper resonant frequency may be selected for particularly suitable use in a transducer operating in the ultrasonic range. Furthermore, by corrugating the diaphragm and supporting it at its periphery, damage resulting from rough handling is minimized.

In using the transducer 1, it is intended that it be coupled to translating apparatus of suitable design capable of producing electrical oscillations in the ultrasonic range. The ultrasonic signals may, in some cases, be modulated, as by an audio frequency signal, and then conducted to the elongated conductor or armature 6 of the transducer 1. The conductor 6, which is disposed in a magnetic field in the air gaps formed by the pole pieces 15, is caused to vibrate in response to the interaction of the magnetic field set up around the conductor by the ultrasonic signals and the permanent magnetic field in the air gaps. The conductor 6 will then vibrate principally in a plane normal to the longitudinal axes of the pole pieces. The diaphragm 5 is attached to the conductor 6, so that the plane in which it lies is normal to the direction of movement of the conductor. Thus, corresponding vibratory movement will be set up in the diaphragm which will cause signals of ultrasonic frequency to be transmitted through the air. The transmitted signals may then be picked up by another similar transducer located at a receiving station nearby and the signals transformed back into corresponding audio frequency waves, a suitable detector being employed, of course, where modulated signals have been transmitted and received.

Although there is shown and described but a single embodiment of the present invention, various changes are possible within the spirit of the invention. For example, it may be found desirable to clamp the diaphragm along its entire periphery instead of only a portion thereof, as illustrated. Also, instead of forming the diaphragm 5 with corrugations such as shown best in Figure 2, it may be formed square wave, saw tooth or of any other desired shape in cross section so that certain portions thereof will lie on one side of the conductor 6 and certain other portions thereof will lie on the other side of the conductor. For protection against mechanical injury and wind, the openings may be covered with a thin metal screen having a nylon mesh behind it without appreciably attenuating the response. Other changes of like nature will undoubtedly suggest themselves to those skilled in the art. Therefore, it is desired that the particular form of the present invention described herein shall be considered as illustrative and not as limiting.

What is claimed is:

1. An ultrasonic transducer for interconverting sound waves and electrical oscillations, said transducer having means for producing a magnetic field, said means including a plurality of pairs of opposed pole pieces, each of said pairs of pole pieces defining an air gap in said magnetic field, all of said air gaps lying in a common plane, a vibratory system comprising a conductor disposed within said air gaps and mounted for vibratory movement with respect to said magnetic field producing means, and a diaphragm supported at at least a portion of its periphery, said diaphragm having a plurality of corrugations extending transversely thereof and describing a serpentine course in spaced relation to and alternately on opposite sides of said pairs of pole pieces, said diaphragm being attached to said conductor for vibration simultaneously therewith.

2. An ultrasonic transducer for interconverting sound waves and electrical oscillations, said transducer having means for producing a magnetic field, said means including a plurality of pairs of pole pieces disposed in tandem at spaced intervals, the respective pole pieces of each pair being spaced apart to provide an air gap therebetween, all of said air gaps being in alignment, a vibratory system for said transducer comprising an elongated conductor disposed within said air gaps and mounted for vibratory movement with respect to said pole pieces, and a diaphragm of thin sheet material, said diaphragm being supported at at least a portion of its periphery and provided with a plurality of corrugations describing a serpentine course in spaced relation to and around said pole pieces, said conductor passing through said diaphragm corrugations and being attached thereto.

3. An ultrasonic transducer for interconverting sound waves and electrical oscillations, said transducer having means for producing a magnetic field, said means including a plurality of pairs of pole pieces disposed in tandem at spaced intervals, the respective pole pieces of each of said pairs being spaced apart to provide an air gap therebetween and all of said air gaps being in alignment, a vibratory system for said transducer comprising an elongated conductor disposed centrally within said air gaps and mounted for vibratory movement with respect to said pole pieces, and a thin diaphragm, said diaphragm being supported at at least a portion of its periphery and having a plurality of corrugations describing a serpentine course about and in spaced relation to said pole pieces, said pole piece pairs being disposed alternately on opposite sides of said diaphragm within said corrugations, said conductor passing through said corrugations and being attached thereto.

4. An ultrasonic transducer comprising a magnetic field structure including a plurality of pairs of pole pieces, the respective pole pieces of each pair being spaced apart to provide an air gap therebetween, said pole piece pairs and said air gaps being aligned, an elongated conductor disposed within said air gaps, a thin diaphragm having a plurality of corrugations, said diaphragm being supported at at least a portion of its periphery and disposed in a serpentine course around and in spaced relation to said pole piece pairs, successive ones of said pairs of pole pieces being disposed alternately on opposite sides of said diaphragm within said corrugations, said conductor passing through said diaphragm corrugations and being attached thereto at points where said conductor passes through said diaphragm.

5. An ultrasonic transducer comprising an endless frame-like magnetic field structure having a central opening, a plurality of pairs of pole pieces extending from the inner periphery of said field structure, the respective pole pieces of each pair being aligned along a common axis and having the adjacent ends thereof freely disposed in spaced apart relation to provide an air gap therebetween, said pole piece pairs being aligned and disposed in parallel, spaced apart relation with said air gaps in alignment, an elongated conductor disposed centrally within said air gaps, and a diaphragm of thin, sheet material, said diaphragm having transverse corrugations and supported at at least a portion of its periphery, said diaphragm being disposed in spaced relation to and describing a serpentine course about said pole piece pairs, said pole piece pairs being disposed alternately on opposite sides of said diaphragm within said corrugations, said conductor extending through said diaphragm and being attached thereto at points where said conductor passes through said diaphragm.

6. The invention set forth in claim 5, wherein said diaphragm peripheral support comprises a part of said magnetic field structure, and wherein means is provided for holding said magnetic field structure in assembled relation, a portion of said means being connected to said conductor for transmitting electrical oscillations between an external circuit and said conductor, and means insulating said portion from said magnetic field structure.

7. A vibratory system for an elyectro-mechanical transducer comprising a straight conductor mounted in a predetermined plane for vibratory movement and a diaphragm attached to said conductor for simultaneous movement therewith, said diaphragm comprising a thin sheet material having transverse corrugations, said conductor extending through and attached to portions of said diaphragm with alternate peaks of said corrugations lying on opposite sides of said plane of said conductor.

8. In a vibratory system for an electro-mechanical transducer, a conductor mounted in a predetermined plane for vibratory movement, a diaphragm provided with a plurality of transverse corrugations attached to spaced portions of said conductor for simultaneous movement therewith, said corrugations comprising alternately reversely directed sections with respect to said plane of said conductor.

References Cited in the file of this patent

UNITED STATES PATENTS

| Number | Name | Date |
| --- | --- | --- |
| 1,759,810 | Edelman | May 20, 1930 |
| 1,815,564 | High | July 21, 1931 |
| 1,934,184 | Gerlach et al. | Nov. 7, 1933 |

FOREIGN PATENTS

| Number | Country | Date |
| --- | --- | --- |
| 609,853 | France | Aug. 25, 1926 |
| 939,508 | France | Jan. 3, 1947 |